United States Patent
Kellner et al.

(10) Patent No.: US 6,927,802 B2
(45) Date of Patent: Aug. 9, 2005

(54) TV RECEIVER WITH INDIVIDUALLY PROGRAMMABLE SAPCHANNEL

(75) Inventors: Jamie Kellner, Burbank, CA (US); Wayne M. Smith, La Cañada, CA (US)

(73) Assignee: Warner Bros. Entertainment Inc., Burbank, CA (US)

(*) Notice: Subject to any disclaimer, the term of this patent is extended or adjusted under 35 U.S.C. 154(b) by 568 days.

(21) Appl. No.: 10/002,075

(22) Filed: Nov. 1, 2001

(65) Prior Publication Data

US 2003/0098926 A1 May 29, 2003

(51) Int. Cl.[7] ............................................. H04N 7/87
(52) U.S. Cl. ..................... 348/485; 348/483; 348/569
(58) Field of Search ................................ 348/738, 480, 348/481, 482, 483, 569, 570, 484, 485; 386/96–99

(56) References Cited

U.S. PATENT DOCUMENTS

| | | | |
|---|---|---|---|
| 4,627,101 A | | 12/1986 | Anderson et al. |
| 4,688,252 A | * | 8/1987 | Kufta et al. .................... 381/4 |
| 4,703,501 A | * | 10/1987 | Sugai et al. ................... 381/10 |
| 4,907,082 A | | 3/1990 | Richards |
| 4,920,416 A | * | 4/1990 | Motoyama ................... 348/738 |
| 5,062,052 A | | 10/1991 | Sparer et al. |
| 5,440,351 A | * | 8/1995 | Ichino ......................... 348/729 |
| 5,442,452 A | * | 8/1995 | Ryu ............................. 386/97 |
| 5,659,366 A | | 8/1997 | Kerman |
| 5,986,716 A | | 11/1999 | Sokawa et al. |
| 5,987,141 A | | 11/1999 | Hoover |
| 5,987,211 A | | 11/1999 | Abecassis |
| 6,037,969 A | | 3/2000 | Lim et al. |
| 6,111,613 A | | 8/2000 | Sasano et al. |
| 6,208,805 B1 | | 3/2001 | Abecassis |

* cited by examiner

Primary Examiner—Michael H. Lee
(74) Attorney, Agent, or Firm—Gottlieb, Rackman & Reisman, P.C.

(57) ABSTRACT

A video signal processor is used to receive programs in the form of a composite video signal which incorporates a video broadcast channel, a main audio channel and an additional audio channel. The main audio channel may carry a standard audio track for the program while the additional audio channel carries a different audio track, such as dialogue in a foreign language, DVS audio track, or a modified audio track that has been changed from the main audio track slightly. The video signal processor selects one of the audio tracks as the active audio track based on the contents of the additional audio channels and/or a viewers' preferences. The video signal processor may be a stand-alone device, or may be incorporated into a TV receiver, VCR, DVD player, etc.

29 Claims, 2 Drawing Sheets

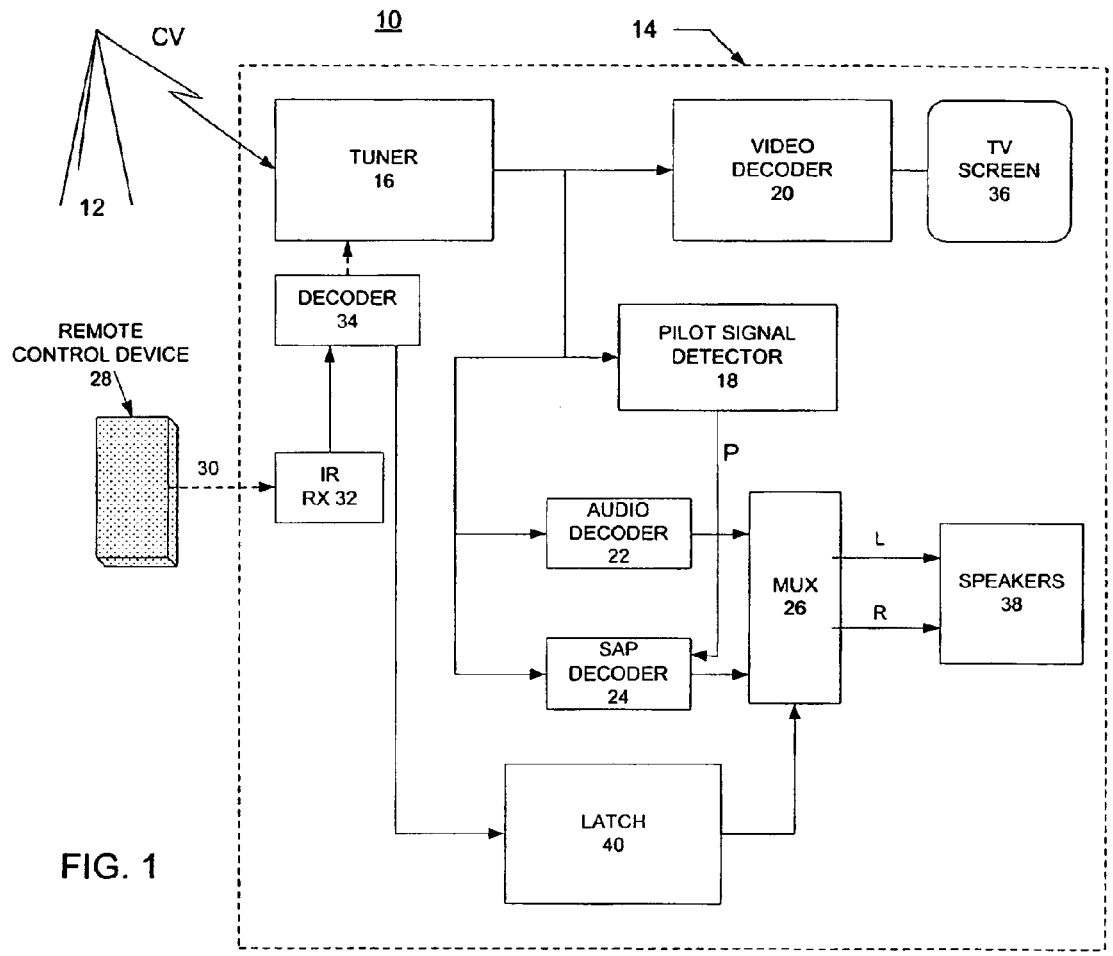
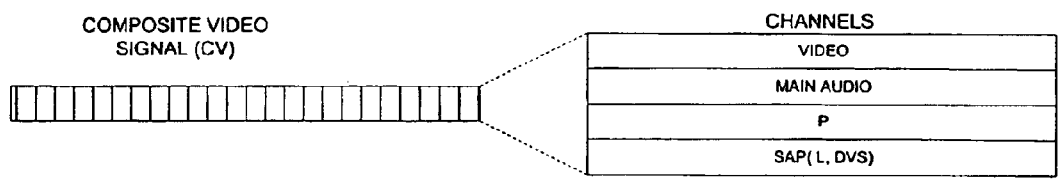
FIG. 1
FIG. 1A PRIOR ART

TV RECEIVER WITH INDIVIDUALLY PROGRAMMABLE SAPCHANNEL

BACKGROUND OF THE INVENTION

A. Field of the Invention

This invention pertains to a video signal processor such as a TV receiver that processes a secondary audio program (SAP) channel. The TV receiver is adapted to allow a viewer to customize it by selecting specific audio tracks on the SAP channel that will be processed for each channel.

B. Description of the Prior Art

Early TV receivers received only a few program channels having a single mono audio track. As TV receivers evolved into the primary source of home entertainment for a majority of the population, program providers and TV manufacturers cooperated to expand the capabilities of TV systems by providing additional services so that a wide range of video programs could be enjoyed by a more diverse population, including people with various disabilities or people speaking different languages. These services include closed captions (CC) to assist people with hearing disabilities; descriptive video services (DVS), which provide a narrative description of action or other scene related information (for example, facial expressions), to aid those with visual impairments; and multi-language audio tracks to allow a viewer to select a language he prefers when viewing a program. viewing a program.

A disadvantage of present TV receivers is that to enable a SAP channel requires an elaborate, often confusing, set-up procedure using a remote control device. And, since a single SAP setting is used universally for all the channels of the TV receiver, the procedure may have to be followed each time a viewer changes channels.

OBJECTIVES AND ADVANTAGES OF THE INVENTION

An objective is to provide a video signal processor such as a TV receiver that allows a viewer to select an SAP preference for each available channel. Thus the viewer does not have to reprogram his TV receiver for his SAP preferences as he switches channels.

Another objective is to provide a TV receiver adapted to automatically determine what kind of signals are present on the SAP of a particular channel and to select which audio track is active based on this determination and on the preferences previously selected by the viewer.

A further objective is to provide a TV receiver in which the viewer can select the active audio track either on a channel-by-channel basis, or universally, for all the channels.

Briefly, a video signal processor such as a TV receiver constructed in accordance with our invention processes a composite video signal received from a broadcaster that includes a video channel and a main audio channel which represent standard video and audio programs, and a secondary audio channel that carries an alternative audio track. In one embodiment of the invention, the alternative audio track is derived from the standard sound signal, for example, by deleting dialog that may not be suitable for children and replacing the same with milder or more acceptable dialog. In another embodiment, the standard sound signal may be directed to a generic audience while the alternative audio track may be tailored for a specific audience, based, for example, on geographic location.

Advantageously, the TV receiver constructed in accordance with our invention includes a selector (such as a remote control device) adapted to set a viewer's preferences for listening to either the standard audio signals or the alternative audio signals on a channel-by-channel basis, rather then selecting a single preference for all channels as required in prior art TV receivers.

Since the TV receiver includes a video signal processor formed of a tuner and output circuitry generating output video and audio signals, a TV screen and speakers, each of these elements can be provided separately. In this latter configuration, the video signal processor can be provided as a stand-alone device, or can be incorporated into other devices such as VCRs, personal video recorders, DVD players, etc.

BRIEF DESCRIPTION OF THE DRAWINGS

FIG. 1 shows a block diagram of a conventional TV receiver receiving a composite video signal;

FIG. 1A shows diagrammatically the conventional video and audio channels imbedded in a composite video signal;

DETAILED DESCRIPTION OF THE INVENTION

Figure 2:
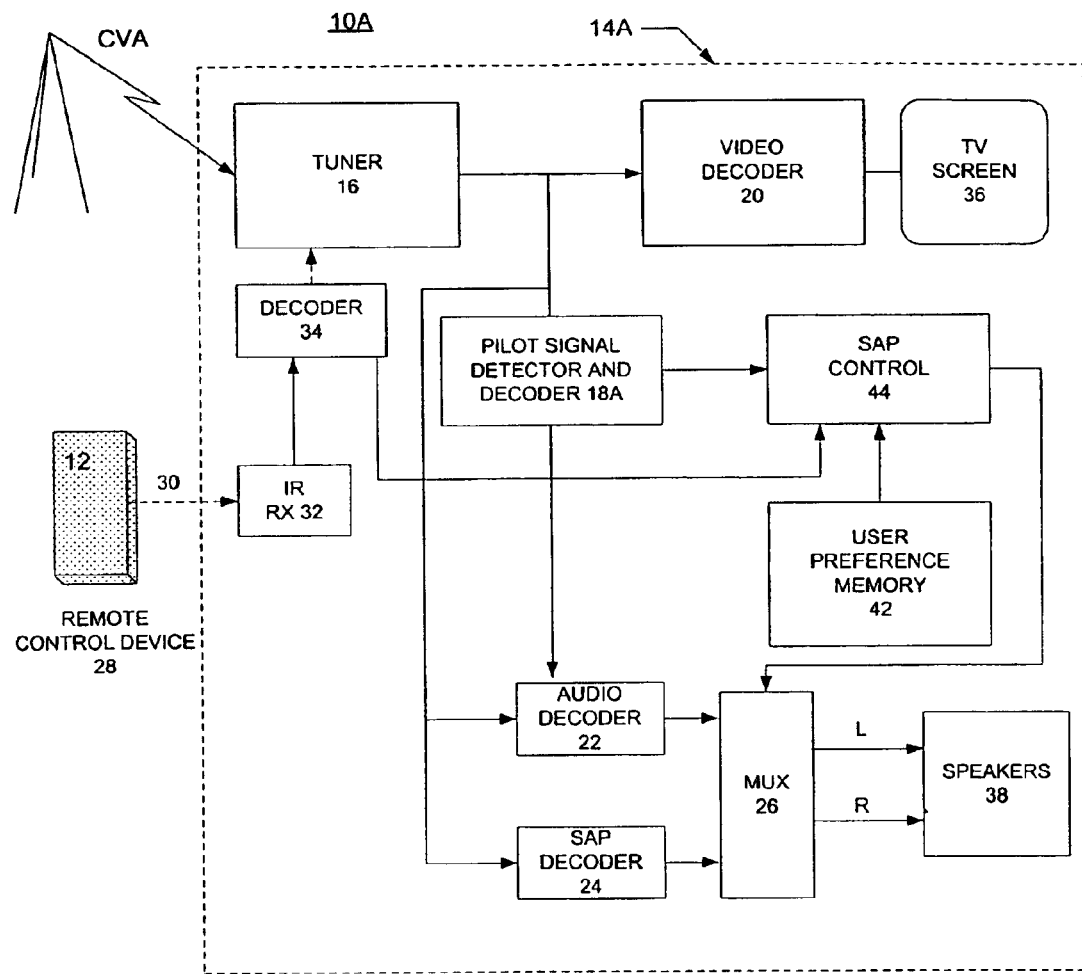
FIG. 2 shows a block diagram of a TV receiver that processes a invention.

FIG. 1 shows a conventional broadcasting system 10 in which a tower 12 sends a composite video signal CV to a TV receiver 14. TV receiver 14 includes a tuner 16, a pilot signal detector 18, a video decoder 20, an audio decoder 22, an SAP decoder 24 and a multiplexer 26.

The TV receiver 14 is controlled by a remote control device 28 which sends a viewer's commands to the TV receiver 14 through an infrared link 30 and an IR receiver 32. Other communication means including ultrasonic or RF signals may be used as well. The remote control device 28 is used by the viewer to perform various functions such as channel selection, volume selection, SAP selection, muting and so on. The output of IR receiver 32 is used by a decoder 34 to decode the commands from the viewer, for example, to tune tuner 16 to a particular channel. The decoder 34 also controls the operation of a latch 40.

As shown in FIG. 1A, the composite video signal CV received by receiver 14 may include a video channel, a main audio channel, a pilot signal (P) and a secondary audio program (SAP) channel. The SAP channel carries either foreign language audio tracks (L) or descriptor video services (DVS) audio tracks.

When the TV receiver 14 is turned on, the tuner 16 receives the composite video signal CV and sends it to the video decoder 20, pilot signal detector 18, audio detector 22 and SAP detector 24. The video detector 20 processes the video signals and generates images on the TV screen 36.

The audio decoder 22 uses the pilot signal P detected by the detector 18. The pilot signal P is present when there are sound signals on the SAP channel. The SAP decoder 24 is enabled by pilot signal P and is used to decode the signals on the SAP channel to generate an auxiliary audio track consisting of dialog in a foreign language (L) or DVS.

The TV receiver 14 is programmed by pressing a sequence of predetermined keys (not shown) on the remote control device 28. During this process a command is send by the remote control device 28 for the latch 40 so that it is either on or off to indicate whether the SAP channels should be selected or not. The multiplexer selects the active audio track based on the state of the latch 40. The latch 40, audio decoder 22, SAP detector 24 and multiplexer 26 may be incorporated into a single audio processing chip. However, in FIG. 1 discrete elements are shown for the sake of clarity.

When the SAP channel is selected, it remains the "active" audio channel until it is deselected by the latch 34 through another setup or programming sequence. Details of the structure and operation of the TV receiver 14 are provided for example in U.S. Pat. No. 4,907,082, incorporated herein by reference.

FIG. 2 shows a broadcasting system 10A constructed in accordance with this invention and including a TV receiver 14A. In this system, the composite video signal CVA has been modified so as to include, for each program channel, a signal I indicative of the contents of the SAP signal, i.e., whether the SAP channel for a particular program channel carries dialog in a different language (L) or DVS. In addition, the SAP channel may also be used to carry an additional audio track (AA) which is slightly modified version of the main audio track. For example, the auxiliary audio track may be customized for a particular geographic location. Alternatively, portions from the main audio track which may contain objectionable dialogue may be replaced in the auxiliary audio track by a redacted dialogue.

Figure 2A:
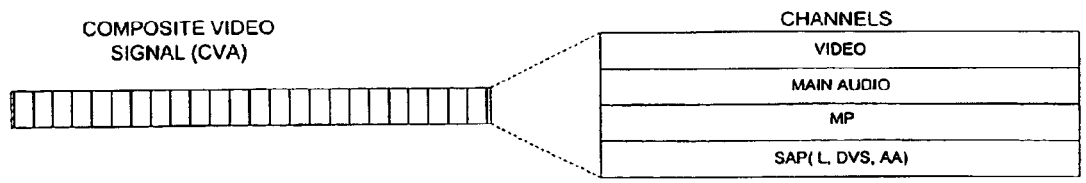
FIG. 2A shows diagrammatically the video and audio channels imbedded in a composite video signal.

The signal I may be provided in any number of ways. In one advantageous arrangement, the pilot signal P is replaced by a modified signal MP (shown in FIG. 2A) which consists of the original pilot signal P which is combined with the signal I using, for instance, amplitude modulation. Therefore TV receiver 14A can determine automatically the contents of the signals on the SAP channel from signal I. For example, signal I can be encoded to indicate the SAP types of signals as follows:

| I | SAP TYPE |
|---|---|
| 1 | NONE |
| 2 | L = SPANISH |
| 3 | L = FRENCH |
| 4 | DVS |
| 5 | AA |

As indicated in this table a separate value may be assigned for French or Spanish sound tracks, for a DVS or for an alternate audio track. Of course the signal I can be provided many other ways as well.

The components of the TV receiver 14A are similar to the components of the conventional TV receiver 14 in FIG. 1 with several notable exceptions. First, the latch 40 has been replaced by a viewer preference memory 42 and an SAP control circuit 44. In addition the pilot signal detector has been replaced by a combined pilot signal detector and decoder 18A.

The viewer preference memory 42 stores viewer preferences for activation of the SAP channel on a channel-by-channel basis. The data for this memory is entered during the setup process for the TV receiver 14A, at which time the viewer uses remote control device 26 to select an SAP preference (i.e., whether the SAP channel is enabled or not) for each channel based on the programming available on that channel, and other criteria, such as the specific audio tracks provided by the broadcaster on the SAP channel, the geographic location and makeup of the viewer's family, the viewer's preferred language, and so on. For example, the viewer may make the choices indicated in the table below, wherein for M a value of 1 indicates that the SAP channel is the active sound channel and a value of 0 indicates that the main sound channel is the active channel:

| CHANNEL | I = 1 | I = 2 | I = 3 | I = 4 | I = 5 | M |
|---|---|---|---|---|---|---|
| 1 |  | x | x |  |  | 1 |
| 2 |  | x |  |  | x | 1 |
| 3 | x |  | x |  |  | 0 |
| ... | ... | ... | ... | ... | ... | ... |
| ALL |  |  |  |  | x | 1 |

This table indicates that the viewer has selected to activate the SAP channel for program channel 1 when the SAP channel contains Spanish dialog or French Dialog. For channel 2 the viewer has opted to activate the SAP if either Spanish dialog or an alternative audio track (AA) is present. For channel 3 the SAP is expressly not selected if a French dialog is present. Obviously, whenever there is no signal on the SAP channel (i.e., I=1) the default value for M is 0.

Finally, as indicated in the table, the viewer may also be given the choice of making a single selection for ALL the channels if he does not want to bother with making individual choices for each program channel. Of course the values for M may be selected using various other types of criteria.

In FIG. 2, the program channel selected by the viewer is provided by the decoder 34 to the tuner 16 and to the SAP control circuit 44. The SAP control circuit 44 then retrieves the value of M from the viewer preference memory 42. For example, referring to the table above, for program channel 2 and an I value of 5 the value of M is 1, meaning that the audio track on the SAP channel should be active channel. Therefore the SAP control circuit 44 sends a control command to the multiplexer 26 to select the SAP channel as the source for the active audio track.

Because the signals on the SAP channel may not always be reliable, the SAP control circuit 44 can monitor the quality of the signals thereon. As long as appropriate SAP signals (typically FM signals) are received on this channel, they are decoded by the SAP decoder 24, and the resulting audio track is provided to speakers 38 through the multiplexer 26. As discussed above, this audio track may be DVS, dialog in another language, or an alternate audio track modified from the main audio track If no SAP signal is received, the audio signal to the speakers 38 is muted. The audio signal processing chip 20 may also be structured so that if the SAP channel has been selected and is present, then one of the output lines from the multiplexer 26, for example, the output line for signal L, is used to output the audio track on the SAP channel, while the other output line R is used to generate a monophonic version of the standard audio track on the main audio channel. The following table depicts the typical operation of the circuitry of FIG. 2:

| LEFT | RIGHT | SIGNAL RECEIVED | STEREO SELECTED | SAP SELECTED |
|---|---|---|---|---|
| MUTE | MUTE | POOR OR NOISY SAP | YES | NO |
| LEFT MONO | RIGHT MONO | STEREO | YES | NO |
|  |  | POOR OR NOISY STEREO | NO | YES |
| MONO | MUTE | POOR OR NOISY SAP | NO | YES |
| MONO | SAP | SAP | NO | YES |
| MONO | MUTE | POOR OR NOISY SAP | NO | YES |

As discussed above, in conventional systems, the SAP is either enabled or disabled for all the program channels.

Therefore, if the SAP is enabled or active and if the particular viewer or family does not speak Spanish or none are visually challenged, then the Spanish and DVS tracks are useless. However, if the SAP were universally deselected at all times, the viewer would not be able to take advantage of an option for modified family oriented audio tracks, or local information available from the alternative audio tracks. Allowing the viewer to select the setting for each channel separately eliminates these disadvantages. The TV receiver 14A may be configured so that the settings can be established or modified only after a code is entered into the remote control device 26, thus preventing unsupervised use by a child.

Preferably, the information in the channel table memory 36 is generated by using the remote control device 26. Of course, the TV receiver 14A may have an integral control (not shown) that is disposed in the same housing as the other circuitry shown in FIG. 2.

The TV receiver 14A described above includes in effect a video signal processor having a tuner and output circuitry generating output video and audio signals, a TV screen 36 and speakers 38. However, each of these elements may be provided separately. In this latter configuration, the video signal processor may be provided as a self-contained stand-alone unit, or may be incorporated into another device, such as a VCR, a DVD player, a personal video recorder.

Obviously, various modifications may be made to the invention without departing from the scope of the invention as defined in the appended claims.

What is claimed is:

1. A video signal processor comprising:
a tuner adapted to receive a composite video signal and an SAP indication signal, said composite video signal including a video channel that carries a video signal for an audio-visual program, a main audio channel that carries a standard audio track for said program, and a SAP channel carrying a different audio track for said program; said SAP indication signal being descriptive of the content of said different audio track;
a selector coupled to said tuner and adapted to select one of said standard and said alternative audio tracks as the active audio track based on said SAP indication signal; and
output circuitry coupled to said tuner to generate output audio and video signals, said output audio signals corresponding to said active audio track.

2. The video signal processor of claim 1 further comprising a memory used for storing a viewer's preference regarding said active audio track, said selector being adapted to select said active audio track based on said viewer preference.

3. The video signal processor of claim 2 wherein said tuner is arranged to receive a plurality of channels selectable by a viewer, each channel being associated with a respective composite video signal including an SAP channel, and said memory including viewer preferences for said active audio track for each said plurality of channels.

4. The video signal processor of claim 2 further comprising a control device adapted to receive said preference for the active audio track from the viewer.

5. A video signal processor comprising:
a tuner adapted to receive a composite video signal, said composite video signal including a video broadcast channel that carries a video track for an audio-visual program, a main audio channel that carries a standard audio track for said program and an SAP channel with a different audio track for said program;
a memory storing a plurality of viewer preferences, said viewer preferences defining whether the viewer wants to hear the standard or the SAP sound track;
a selector adapted to receive a viewer preference from said memory, and to select one of said standard and different audio tracks as the active audio track based said viewer preference; and
output circuitry adapted generate a output audio and video signals, said output audio signal corresponding to said active audio track.

6. The video signal processor of claim 5 wherein said tuner is adapted to receive composite video signals for a plurality of program channels, and said memory is used to store information defining the viewer preference for each of said program channels.

7. The video signal processor of claim 5 wherein said composite video signal includes an SAP indication signal related to the contents of said different audio track, and wherein said selector is further adapted to select said active audio track based on said SAP indication signal.

8. The video signal processor of claim 7 wherein said composite video signal includes a modified pilot signal indicative of the presence of said SAP channel and its contents.

9. A broadcasting system comprising:
a broadcasting apparatus adapted to transmit a composite video signal, said composite video signal including a video broadcast channel that carries a video signal for an audio-visual program, a main audio channel that carries a standard audio track for said program, an SAP channel that carries a different audio track for said program, and an SAP indication signal indicative of the contents of said different audio signal; and
a plurality of video signal processors adapted to receive said composite video signal and to generate output video signals, said video signal processors including a selector adapted to select one of said main and different audio tracks as the active audio track based on said SAP indication signal, said video signal processors further generating output sound signals corresponding to said active audio track.

10. The system of claim 9 wherein said composite video signal includes a pilot signal.

11. The system of claim 10 wherein said SAP indication signal is combined with said pilot signal.

12. The system of claim 9 wherein a plurality of program channels are selectable by a user one of said video signal processors, each program channel being associated with a respective composite video signal, and said selector in said video signal processor is adapted to select an active audio track for each program channel.

13. The system of claim 12 wherein said one video signal processor is associated with a remote control device adapted to receive viewer preferences for the active audio track for each program channel.

14. A broadcasting system comprising:
a broadcasting apparatus adapted to transmit a composite video signal, said composite video signal including a video channel that carries a video signal for an audio-visual program, a main audio channel that carries a standard audio track for said program, and an additional audio channel that carries a different audio track for said program and an indicating signal descriptive of the contents of said additional audio channel; and
a plurality of TV receivers adapted to receive said composite video signal and to display images corresponding to said video channel, said TV receivers generating sounds corresponding to one of said standard and alternative audio tracks based on the contents of said alternative audio tracks as indicated by said indication signal.

15. The system of claim 14 wherein each TV receiver includes an automatic selector that determines which of said audio tracks is the active audio track.

16. The system of claim 14 wherein said additional audio channel is an SAP channel.

17. The system of claim 15 wherein each receiver includes a memory used to store viewer preferences.

18. The system of claim 17 wherein each TV receiver is adapted to receive composite video signals on a plurality of program channels, and said memory is used to store a viewer preference for each of said program channels.

19. A TV receiver comprising:
  a tuner adapted to receive a composite video signal, said composite video signal including a video broadcast channel that carries a video track for an audio-visual program, a main audio channel that carries a standard audio track for said program, and a SAP channel carrying a different audio track for said program; and an SAP indication signal descriptive of the content of said different audio track;
  a screen adapted to display images corresponding to said video signal;
  a selector adapted to select one of said standard and said alternative audio tracks as the active audio track based on said SAP indication signal; and
  a speaker adapted to generate sounds corresponding to said active audio track.

20. The TV receiver of claim 19 further comprising a memory used for storing a viewer's preference regarding said active audio track, said selector being adapted to select said active audio track based on said viewer preference.

21. The TV receiver of claim 20 wherein said tuner is arranged to receive a plurality of channels selectable by a viewer, each channel being associated with a respective composite video signal including an SAP channel, and said memory including viewer preferences for said active audio track for each said plurality of channels.

22. The TV receiver of claim 20 further comprising a control device adapted to receive said preference for the active audio track from the viewer.

23. A TV receiver comprising:
  a tuner adapted to receive a composite video signal, said composite video signal including a video broadcast channel that carries a video track for an audio-visual program, a main audio channel that carries a standard audio track for said program and an SAP channel with a different audio track for said program;
  a screen adapted to display images corresponding to said video signal;
  a memory storing user preferences defining for a plurality of program channels the corresponding audio channel;
  a selector adapted to receive a viewer preference from said memory and to select one of said standard and different audio tracks as the active audio track based said viewer preference; and
  a speaker adapted to generate sounds corresponding to said active audio track.

24. The TV receiver of claim 23 wherein said composite video signal includes an SAP indication signal related to the contents of said different audio track, and wherein said selector is further adapted to select said active audio track based on said SAP indication signal.

25. The TV receiver of claim 24 wherein said composite video signal includes a modified pilot signal indicative of the presence of said SAP channel and its contents.

26. A composite video signal comprising a video channel that carries a video signal for an audio-visual program, a main audio channel that carries a standard audio track for said program, and a SAP channel carrying a different audio track for said program; said SAP indication signal being descriptive of the content of said different audio track.

27. The composite video signal of claim 22 wherein one of said standard and different audio tracks includes dialog for general audiences and the other of said standard and different audio tracks includes dialog for mature audiences.

28. The composite video signal of claim 27 wherein said standard audio track includes dialog for general audiences and said different audio track includes dialog for mature audiences.

29. The composite video signal of claim 26 wherein one of said standard and different audio tracks includes dialog for general audiences and the other of said standard and different audio tracks includes dialog for audiences at specific geographic locations.

* * * * *